(12) United States Patent
Nara (10) Patent No.: US 7,949,189 B2
(45) Date of Patent: May 24, 2011

(54) IMAGING APPARATUS AND RECORDING MEDIUM

(75) Inventor: Kazuya Nara, Hachioji (JP)

(73) Assignee: Casio Computer Co., Ltd., Tokyo (JP)

( * ) Notice: Subject to any disclaimer, the term of this patent is extended or adjusted under 35 U.S.C. 154(b) by 274 days.

(21) Appl. No.: 12/392,285

(22) Filed: Feb. 25, 2009

(65) Prior Publication Data

US 2009/0220160 A1 Sep. 3, 2009

(30) Foreign Application Priority Data

Feb. 29, 2008 (JP) ................................. 2008-050221

(51) Int. Cl.
*G06K 9/00* (2006.01)
*G06K 9/62* (2006.01)
(52) U.S. Cl. ........................................ 382/189; 382/209
(58) Field of Classification Search .................... 382/18, 382/190, 209; 358/400; 352/39; 375/240.16; 725/9; 902/1–3; 713/182; 714/789; 386/353, 386/326, 714; 348/335, E5.024, 581, 715; 348/E9.37, E9.055; 396/14
See application file for complete search history.

(56) References Cited

U.S. PATENT DOCUMENTS

| 2008/0036898 | A1* | 2/2008 | Inoue .......................... 348/335 |
| 2009/0087097 | A1* | 4/2009 | Suehiro et al. ................ 382/190 |
| 2009/0103621 | A1* | 4/2009 | Numata et al. ........... 375/240.16 |
| 2010/0259683 | A1* | 10/2010 | Setlur ........................... 348/581 |
| 2010/0272365 | A1* | 10/2010 | Yamamoto et al. ........... 382/190 |

FOREIGN PATENT DOCUMENTS

| JP | 10-178580 A | 6/1998 |
| JP | 2006-293720 A | 10/2006 |
| JP | 2007-213177 A | 8/2007 |

OTHER PUBLICATIONS

Japanese Office Action dated Jan. 13, 2010 and English translation thereof issued in a counterpart Japanese Application No. 2008-050221.

* cited by examiner

*Primary Examiner* — Samir A Ahmed
*Assistant Examiner* — Mehdi Rashidian
(74) *Attorney, Agent, or Firm* — Holtz, Holtz, Goodman & Chick, PC (57) ABSTRACT

In a digital camera 1, when the shutter button is half-depressed (Y at S2), face detection processing is performed on periodically imaged frame images until it is fully depressed (N at S6), and face detection results are cyclically stored in a detection result storage area. When it is fully depressed (Y at S6), a still-image imaging operation is performed, and the face detection processing is performed on an imaged still-image (S7 and S8). Then, after a high priority face detection result is selected from among the face detection results currently stored in the detection result storing area (S9), the selected face detection result and the face detection result of the still-image are compared and judged whether or not they are in agreement (S10 and S11). When judged not to be in agreement, the still-image is displayed as a preview and the warning display of this disagreement is performed (S13).

15 Claims, 4 Drawing Sheets

IMAGING APPARATUS AND RECORDING MEDIUM

CROSS-REFERENCE TO RELATED APPLICATION

This application is based upon and claims the benefit of priority from the prior Japanese Patent Application No. 2008-050221, filed Feb. 29, 2008, the entire contents of which is incorporated herein by reference.

BACKGROUND OF THE INVENTION

1. Field of the Invention

The present invention relates to an imaging apparatus providing a function for detecting a photographic subject, and a recording medium in which a program thereof is recorded.

2. Description of the Related Art

A face detection technology is known in which a face within image data is detected (refer to Japanese Patent Application Laid-Open (Kokai) Publication No. 2006-293720).

When a camera implementing the above-described face detection technology is used, a detected face can be focused, and an image can be obtained in which the face is in focus. However, even if a face detected in a Live-view display state is in a state desired by a photographer, a state not desired by the photographer is sometimes recorded by the time a recording instruction is given.

SUMMARY OF THE INVENTION

The present invention has been conceived in light of the above-described conventional issues, and is to provide an imaging apparatus and a program thereof that allows the user to easily recognize whether or not a sudden change has occurred to a photographic subject between a condition before imaging and a condition when a still-image is actually imaged.

In accordance with one aspect of the present invention, there is provided an imaging apparatus comprising: a first imaging control means for periodically imaging; a first detection means for detecting a predetermined photographic subject from an image data imaged by the first imaging control means; an instruction means for instructing to imaging still-image during periodic imaging by the first imaging control means; a second imaging control means for imaging still-image when instructed by the instruction means; a second detection means for detecting a predetermined photographic subject from a still-image data imaged by the second imaging control means; a comparison means for comparing a result of the photographic subject detection by the first detection means with a result of the photographic subject detection by the second detection means; and an informing means for informing a comparison result by the comparison means.

In accordance with another aspect of the present invention, there is provided a computer-readable storage medium having a program stored thereon that is executable by a computer included in an imaging apparatus to cause the computer to perform a process comprising: a first imaging control processing for periodically imaging; a first detection processing for detecting a predetermined photographic subject from an image data imaged by the first imaging control processing; an instruction processing for instructing to imaging still-image during periodic imaging by the first imaging control processing; a second imaging control processing for imaging still-image when instructed by the instruction processing; a second detection processing for detecting a predetermined photographic subject from a still-image data imaged by the second imaging control processing; a comparison processing for comparing a result of the photographic subject detection by the first detection processing with a result of the photographic subject detection by the second detection processing; and an informing processing for informing a comparison result by the comparison processing.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

The present invention will hereinafter be described in detail with reference to the preferred embodiments shown in the accompanying drawings.

Embodiment

Figure 1:
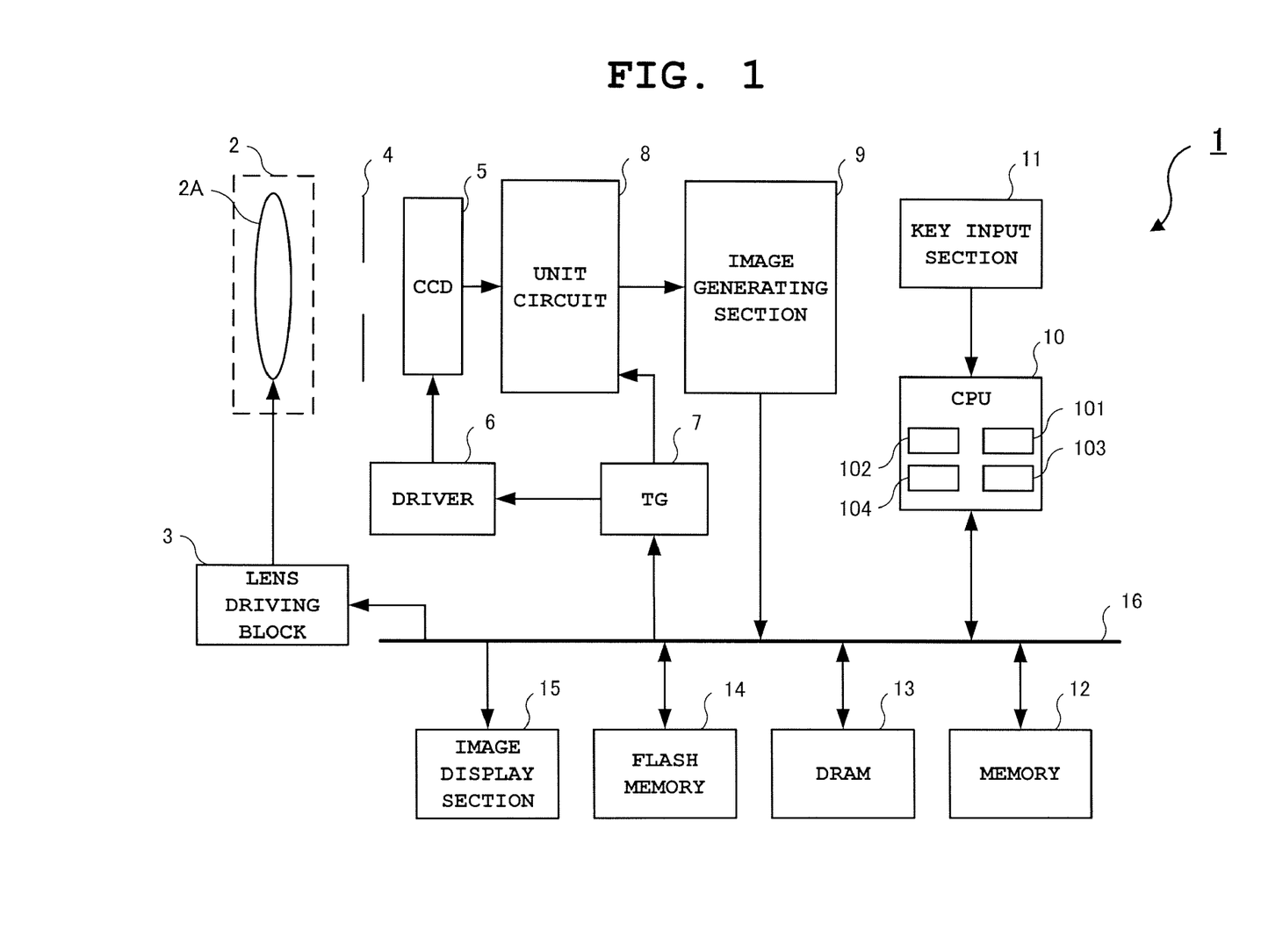
FIG. 1 is a block diagram of a digital camera according to an embodiment of the present invention.

FIG. 1 is a block diagram showing an electrical schematic of a digital camera 1 actualizing an image apparatus of the present invention. The digital camera 1 includes an imaging lens 2, a lens driving block 3, an aperture 4, a charge-coupled device (CCD) 5, a driver 6, a timing generator (TG) 7, a unit circuit 8, an image generating section 9, a central processing unit (CPU) 10, a key input section 11, a memory 12, a dynamic random access memory (DRAM) 13, a flash memory 14, an image display section 15, and a bus 16.

The imaging lens 2 is formed by a plurality of lens groups not shown and includes at least a focus lens 2A. The lens driving block 3 is connected to the focus lens 2A. The lens driving block 3 includes a focus motor and a focus motor driver. The focus motor drives the focus lens 2A in the optical axis direction. The focus motor driver drives the focus motor in adherence to a control signal sent from the CPU 10 not shown.

The aperture 4 includes a driver circuit (not shown), and the driver circuit activates the aperture 4 in adherence to a control signal sent from the CPU 10.

The aperture 4 refers to a mechanism for controlling an amount of light irradiated from the imaging lens 2.

The driver 6 drives the CCD 5 (image sensor element). The CCD 5 photo-electrically converts the light intensity of the respective colors in a red-green-blue (RGB) value of a photographic subject image to an imaging signal at a constant cycle and outputs the imaging signal to the unit circuit 8. The operation timing of this driver 6 and the unit circuit 8 is controlled by the CPU 10 via the TG 7. Note that the CCD 5 has the color filters of Bayer array, and also has a function of an electronic shutter. The shutter speed of this electronic shutter is controlled by the CPU 10 via the driver 6 and the TG 7.

The TG 7 is connected to the unit circuit 8. The unit circuit 8 includes a correlated double sampling (CDS) circuit, an automatic gain control (AGC) circuit, and an analog-to-digital (A/D) converter. The CDS circuit performs correlated double sampling on an imaging signal outputted from the CCD 5 and holds the sampled imaging signal. The AGC circuit performs automatic gain control on the sampled imaging signal. The A/D converter converts the automatic-gain-controlled analog imaging signal to a digital signal. The imaging signal outputted from the CCD 5 is sent to the image generating section 9 as a digital signal via the unit circuit 8.

The image generating section 9 performs processing, such as γ correction processing and white balance processing on image data sent from the unit circuit 8, and generates luminosity color-difference signals (YUV data). The generated luminosity color-difference signal image data is stored in the DRAM 13 (buffer memory). In short, the image generating section 9 performs imaging processing on image data outputted from the CCD 5.

The CPU 10 is a one-chip microcomputer having a function that performs imaging control on the CCD 5, record processing for compressing image data stored in the buffer memory and recording the compressed image data in the flash memory 14, and display processing for displaying image data stored in the buffer memory, and controls each section of the digital camera 1. In addition, the CPU 10 includes a clock circuit.

Particularly, the CPU 10 includes an imaging control section 101, a still-image imaging control section 102, a face detection section 103, and a comparative judgment section 104. The imaging control section 101 periodically controls imaging of image data of a photographic subject. The still-image imaging control section 102 controls still-image imaging of a photographic subject. The face detection section 103 detects a face in periodically imaged image data and still-image data obtained through a still-image imaging operation. The comparative judgment section 104 compares a face detection result of face detection processing performed on image data imaged by the imaging control section 101 and a face detection result of a face detection processing performed on image data imaged by the still-image imaging control section 102, and judges whether or not the face detection results are in agreement.

According to the embodiment and in a variation example described hereafter, the CPU actualizes an imaging control means, a first photographic subject detection means, an imaging instruction means, a still-image imaging control means, a second photographic subject detection means, a comparison means, a informing means, a judgment means, a display means, an imaging-preparation instruction means, and a smile detection means.

The key input section 11 includes a plurality of operation keys such as a shutter button enabling both half-depression and full depression, a mode selection key, a cross key, a SET key, and a cancel key, and outputs operation signals that correspond to the key operations performed by the user to the CPU 10.

The memory 12 stores a control program required for the CPU 10 to control each section of the digital camera 1 and necessary data, and the CPU 10 operates in accordance with this program.

The DRAM 13 is used as a buffer memory for temporarily storing image data imaged by the CCD 5 sent from the CPU 10, and also used as a working memory of the CPU 10. The DRAM 13 also temporarily stores a face detection result sent from the face detection section 103.

The flash memory 14 is a storage medium storing therein compressed image data.

The image display section 15 (display means) includes a color liquid crystal display (LCD) and a driver circuit thereof. In an imaging stand-by state, the image display section 15 displays a photographic subject imaged by the CCD 5 as a Live-view. In the playback of recorded image, the image display section 15 reads out recorded image from the flash memory 14 and displays an expanded version of the recorded image.

B. Operations of the Digital Camera 1

An operation of the digital camera 1 according to the embodiment will hereinafter be described with reference to a flowchart in FIG. 2.

When the imaging mode is set by the user operation of the mode selection key, the imaging control section 101 of the CPU 10 initiates processing for imaging a photographic subject using the CCD5 at a predetermined frame rate, and initiates a so-called Live-view display (Step S1). In the Live-view display, the imaging control section 101 stores in the buffer memory (DRAM 13) frame image data (YUV data) of luminosity color difference signals sequentially imaged by the CCD 5 and generated by the image generating section 9, and the image display section 15 displays images based on the stored frame image data.

Next, at Step S2, the CPU 10 judges whether or not the user has half-depressed the shutter button. This judgment is made based on whether or not an operation signal corresponding to the half-depression operation of the shutter button is sent from the key input section 11.

At this time, ordinarily, the user half-depresses the shutter button when the photographic subject is almost in a desired state.

When judged that the shutter button has not been half-depressed, the CPU 10 remains at Step S2 until the shutter button is half-depressed. When judged that the shutter button has been half-depressed, the CPU 10 proceeds to Step S3. The face detection section 103 of the CPU 10 performs face detection processing for detecting a face on frame image data most recently imaged by the CCD 5. At this time, the face detection section 103 detects whether or not a human face is present within the entire area (entire range of field angle) of the imaged frame image data. In other words, a range subjected to the face detection processing is the entire area of the image data.

The face detection processing is a known art and thus will not be described in detail. However, for example, a method can be used in which feature data (feature data of eyes, eyebrows, nose, mouth, ears, and the like) of a typical human face is stored in advance is compared with image data imaged, and a degree of coincidence between the feature data and the image data is determined. An area in which the degree of coincidence is a predetermined value or more is detected as a human face. Alternatively, a method can be used in which a skin-color area is detected, and when a contour of the detected skin-color area is a contour of a typical human face stored in advance, the area is detected as a face.

Next, at Step S4, the face detection section 103 of the CPU 10 performs processing for cyclically storing a face detection result in the detection result storage area of the buffer memory. This face detection result refers to the number of faces detected, and the positions and the sizes of the detected faces. In cyclical storage, the face detection results of frame image data are sequentially stored until the detection result storage area of the buffer memory is full. When the detection result storage area is full, the oldest face detection result among a plurality of face detection results stored in the detection result storage area is overwritten by the face detection result of the face detection processing performed on new frame image data, and the new face detection result is stored. As a result, face detection results for most recently imaged frame image data to frame image data imaged a predetermined amount of time earlier (a predetermined number of images earlier) are stored.

Next, the CPU 10 initiates processing for displaying a face detection frame superimposed on the Live-view, based on the most recent face detection result (Step S5).

Here, the displaying of a face detection frame based on a face detection result refers to the displaying of a frame called face detection frame in a face area corresponding to the detected position and size of each face.

Figure 3A:
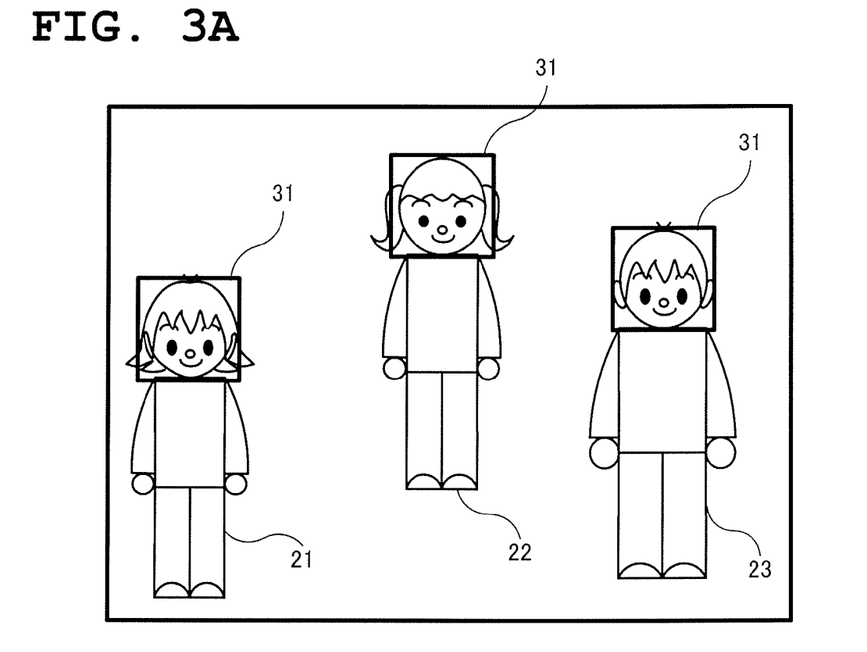
FIG. 3A is an example diagram of a displayed Live-view and face detection frames.

FIG. 3A is an example diagram of the displayed Live-view and the face detection frame.

In FIG. 3A, a photographic subject (person) 21, a photographic subject (person) 22, and a photographic subject (person) 23 have been imaged and displayed as the Live-view. Also, face detection frames 31 superimposed on the Live-view have been displayed in the detected face areas. In other words, the respective faces of the photographic subject 21, the photographic subject 22, and the photographic subject 23 have been detected, and the face detection frames 31 have been displayed on each face.

This display enables the user to check whether or not the photographic subjects are in a state that the user wishes to image, and when the photographic subjects are not in the intended state, enables the user to correct the state of the photographic subjects to the intended state by giving an instruction to the photographic subject and the like.

Next, the CPU 10 judges whether or not the user has fully depressed the shutter button. This judgment is made based on whether or not an operation signal corresponding to the full-depression operation of the shutter button has been sent from the key input section 11 (Step S6).

At this time, when the photographic subjects are in the intended state, the user fully depresses the shutter button.

When judged at Step S6 that the shutter button has not been fully depressed the CPU 10 returns to Step S3 until the shutter button is fully depressed. As a result, the face detection processing is performed on each of frame image data sequentially imaged by the CCD 5, and the face detection result of the face detection processing is cyclically stored in the detection result storage area of the buffer memory. Note that the operations at Step S3 to Step S5 are completed before the next frame image data is imaged.

On the other hand, when judged at Step S6 that the shutter button has been fully depressed, the still-image imaging control section 102 of the CPU 10 performs the still-image imaging processing (Step S7).

Next, the face detection section 103 of the CPU 10 performs the face detection processing for detecting a face on the still-image data imaged by the still-image imaging processing (Step S8). At this time, the face detection section 103 detects whether or not a human face is present in the entire area (entire range of the field angle) of the imaged frame image data.

Next, the comparative judgment section 104 of the CPU 10 selects a high priority face detection result from among the face detection results obtained before the full depression of the shutter button (Step S9). The priority of face detection results is determined based on all the various factors such as the number of detected faces, the proximity of each detected face to the center of the field angle, and the size of each detected face. Therefore, the priority of the face detection result is higher when more faces are detected by the face detection processing performed on the frame image data, when each face detected by the face detection processing performed on the frame image data is closer to the center of the field angle, or when each face detected by the face detection processing performed on the frame image data is larger. As a result, the highest priority face detection result is selected from among the face detection results stored in the detection result storage area of the buffer memory or, in other words, from among the face detection results of each of frame image data stored immediately before the full-depression of the shutter button to a predetermined amount of time earlier (a predetermined number of images earlier).

Here, a face detection result such as that shown in FIG. 3A is selected.

Next, the comparative judgment section 104 of the CPU 10 compares the selected face detection result and the face detection result from the face detection processing at Step S8 (Step S10), and judges whether or not the face detection results are in agreement (Step S11).

This comparison and the judgment regarding the agreement are performed as follows. First, the number of faces, the position of each face, and the size of each face of the selected face detection result and the number of faces, the position of each face, and the size of each face of the face detection result from the face detection processing at Step S8 are compared, and then whether or not they are in agreement is judged.

Specifically, whether or not the number of faces in the selected face detection result and the number of faces in the face detection result from the face detection processing at Step S8 are in agreement, whether or not the position of each face in the selected face detection result and the position of each corresponding face in the face detection result from the face detection processing at Step S8 are in agreement within a predetermined range, and whether or not the size of each face in the selected face detection result and the size of each corresponding face in the face detection result from the face detection processing at Step S8 are in agreement within a predetermined size are compared. When all of these requirements are satisfied, the face detection results are judged to be in agreement.

When judged at Step S11 that the selected face detection result and the face detection result from the face detection processing at Step S8 are in agreement, the image display section 15 displays the still-image data imaged at Step S7 as a preview (Step S12) and the CPU 10 proceeds to Step S15.

On the other hand, when judged at Step S11 that the selected face detection result and the face detection result from the face detection processing at Step S8 are not in agreement, the image display section 15 displays the still-image data imaged at Step S7 as a preview and displays a warning stating that the face detection results are not in agreement (Step S13). This warning is displayed by the identification display of a face area that is based on the position and the size of a face judged not to be in agreement which is in the face detection result selected at Step S9.

Figure 3B:
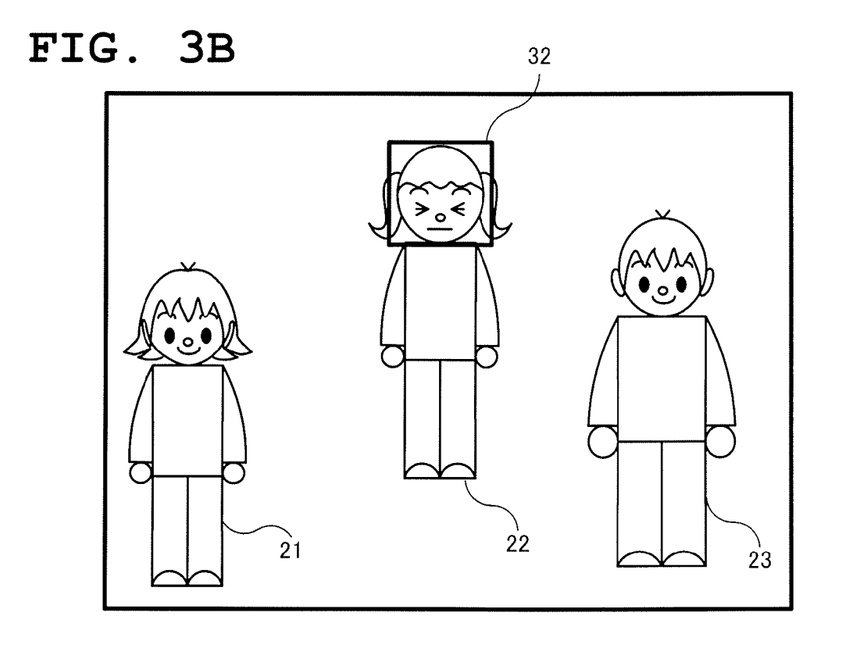
FIG. 3B is an example diagram of still-image data displayed as a preview, and an identification display of a face area.

FIG. 3B is an example diagram of still-image data displayed as a preview and the identification display of a face area.

In FIG. 3B, the eyes of the photographic subject 22 are closed in the still-image data. Therefore, the face of the photographic subject 22 will not be detected by the face detection processing. As a result, a face area that corresponds to the face area of the photographic subject 22, among the face detection frames 31 (detected face areas) in FIG. 3A indicating the selected face detection result, is not found in FIG. 3B. Therefore, by superimposing a warning frame 32 on the still-image data and displaying the warning frame 32 in the same area as the face detection frame 31 of the photographic subject 22 shown in FIG. 3A, it is possible to warn (inform) the user of an area in which a sudden change has occurred between before and after the full-depression of the shutter button.

Next, when the still-image data is displayed as a preview and the warning is displayed, the CPU 10 judges whether or not the user has performed an operation to give a recording instruction (Step S14).

At this time, in the case where the user has operated the SET key, the CPU 10 judges that the user has performed the operation to generate a recording instruction, and in the case where the user has operated the cancel key, the CPU 10 judges that the user has given an instruction not to record.

When judged at Step S14 that a recording instruction operation is performed, the CPU 10 proceeds to Step S15. When judged that a recording instruction operation is not performed or, in other words, an instruction not to record is given, the CPU 10 returns to Step S1.

At Step S15, the CPU 10 compresses the imaged still-image data and records the compressed still-image data to the flash memory 14. The CPU 10 then returns to Step S1.

Note that when another mode is selected during the imaging mode by the operation of the mode selection key, the imaging mode is terminated.

As described above, according to the embodiment, the face detection result of the face detection processing performed on a Live-view and the face detection result of the face detection processing performed on the still-image data are compared, and whether or not the face detection results are in agreement within a predetermined range is judged. Then, when the face detection results are not in agreement, the still-image data is displayed as a preview, and a warning stating that the face detection results are not in agreement is displayed. Therefore, it is easily recognized by the user whether or not a sudden change has occurred to the photographic subject between the Live-view before imaging and the imaged still-image data.

In addition, the warning is displayed by the warning frame 32 being displayed in the face area of a face that is not in agreement, among faces detected in the Live-view. Therefore, an area that is not in agreement is easily recognized by the user.

Furthermore, when the warning is displayed, still-image data is not recorded unless a recording instruction is given by the user. Therefore, the recording capacity the flash memory 14 is not wasted.

VARIATION EXAMPLES

The following variation examples are also possible according to the embodiment.

(01) According to the above-described embodiment, the highest priority face detection result is selected from among face detection results for each of frame image data imaged immediately before the full-depression of the shutter button to a predetermined amount of time earlier (a predetermined number of images earlier). However, the face detection result of the face detection processing performed on frame image data imaged immediately before the full-depression of the shutter button may be selected regardless of priority. Alternatively, the face detection result of the face detection processing performed on frame image data imaged immediately after the half-depression of the shutter button may be selected regardless of priority.

In these cases, the face detection results are not required to be cyclically stored. In addition, when the face detection result of the face detection processing performed on frame image data imaged immediately after the half-depression of the shutter button is selected, the face detection processing is required to be performed only once after the half-depression of the shutter button.

Alternatively, a face detection result obtained a predetermined amount of time earlier (a predetermined number of images earlier) than the full-depression of the shutter button may be selected from among face detection results for each of frame image data stored immediately before the full-depression of the shutter button to a predetermined amount of time earlier (a predetermined number of images earlier).

As a result, in the case where the state of the photographic subject changes between the judgment by the user that the photographic subject is in the desired state and the full-depression of the shutter button, and the face detection result of the face detection processing performed on the frame image data imaged immediately before the full-depression of the shutter button is a face detection result of frame image data differing from that intended by the user, or in the case where the user judges that the state of the photographic subject is desirable even when it is of low priority, a situation can be prevented in which a result with high priority is selected and comparison is performed using frame image data differing from that intended by the user.

(02) According to the above-described embodiment, the priority of face detection results is determined based on all the various factors such as the number of detected faces, the proximity of each detected face to the center of the field angle, and the size of each detected face. However, the priority may be determined based on at least one factor among the number of detected faces, the proximity of each detected face to the center of the field angle, and the size of each detected face. Alternatively, the priority may be determined based on other factors.

The other factors are, for example, whether or not a face registered in advance is detected, the number of detected faces that are registered in advance, a smile evaluation value obtained through smile detection, and a degree of coincidence regarding whether or not a detected photographic subject is the same photographic subject.

As a result, it is easily recognized by the user whether or not a sudden change has occurred to the photographic subject between the Live-view before imaging and the imaged still-image data.

(03) According to the above-described embodiment, the number of detected faces, the positions of detected faces, and the sizes of detected faces are compared to judge whether or not the face detection results are in agreement. However, whether or not face detection results are in agreement may be judged through the comparison of only the number of faces, the comparison of only the positions of faces, or the comparison of only the size of faces.

Also, whether or not the face detection results are in agreement may be judged based on more than one condition among the number of detected faces, the positions of detected faces, and the sizes of detected faces.

As a result, it is easily recognized by the user whether or not a sudden change has occurred to the photographic subject between the Live-view before imaging and the imaged still-image data.

(04) According to the above-described embodiment, the number of faces, the position of each face, and the size of each face detected by the face detection processing performed on a Live-view, and the number of faces, the position of each face, and the size of each face detected by the face detection processing performed on the still-image data are respectively compared, and whether or not they are in agreement is judged. However, the position and the size of only the face closest to the center of the field angle among a plurality of detected faces may be compared and judged whether or not they are in agreement. Alternatively, the position and the size of only the largest face among a plurality of detected faces may be compared and judged whether or not they are in agreement. This is because, the face closest to the center of the field angle or the largest face is considered to be a main photographic subject that the user wishes to image and, therefore, the state of the main photographic subject is the most important.

Figure 2:
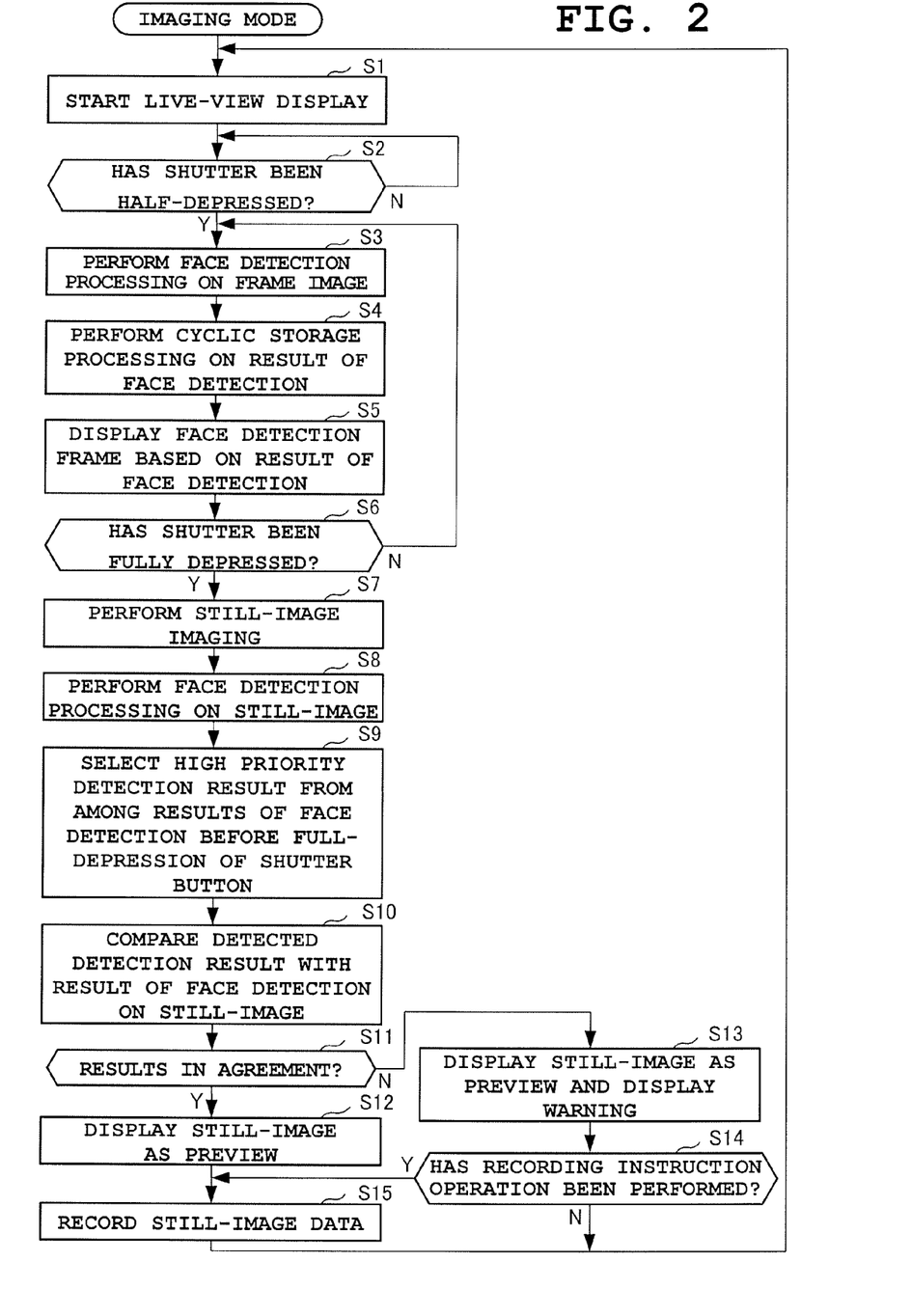
FIG. 2 is a flowchart showing an operation of a digital camera 1 according to the embodiment.

(05) According to the above-described embodiment, the face detection processing on still-image data is performed on the entire area of still-image data (Step S8 in FIG. 2). However, when the shutter button is fully depressed, the face detection processing may be performed on only each area that is based on the position and the size of a face which is a face detection result selected at Step S9 in still-image data. In this case, the operation at Step S9 is required to be performed before the operation at Step S8. Here, the above described each area that is based on the position and the size of a face may be the same area as a detected face area or an area larger than a detected face area.

Figure 4A:
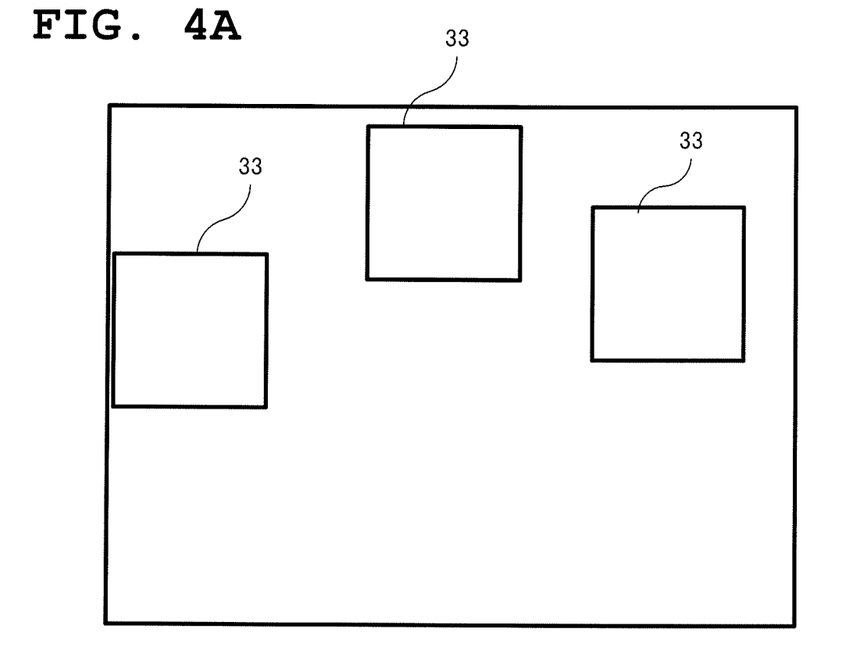
FIG. 4A is an example diagram of an area subjected to face detection in a variation example.

FIG. 4A is an example diagram of an area subjected to face detection when a face detection result such as that shown in FIG. 3A is selected. Here, areas 33, which are the areas based on the position and the size of each face and are face detection results such as that shown in FIG. 3A, are areas larger than a detected face area.

As a result of the face detection processing being performed on each area 33 shown in FIG. 4A in the still-image data, the load of the face detection processing is reduced. Moreover, when a face is detected in each area 33, the selected face detection result and the face detection result of the face detection processing performed on the still-image data are judged to be in agreement, and thus the comparative judgment processing is light.

(06) According to the above-described embodiment, the warning is displayed by still-image data being displayed as a preview and the warning frame 33 being superimposed on the same area as a face area that is based on the position and the size of a face judged not to be in agreement in the face detection result selected at Step S9. However, identification display may be performed by the enlarged display of the image data of the same area as a face area that is based on the position and the size of a face judged not to be in agreement in still-image data displayed as a preview.

Figure 4B:
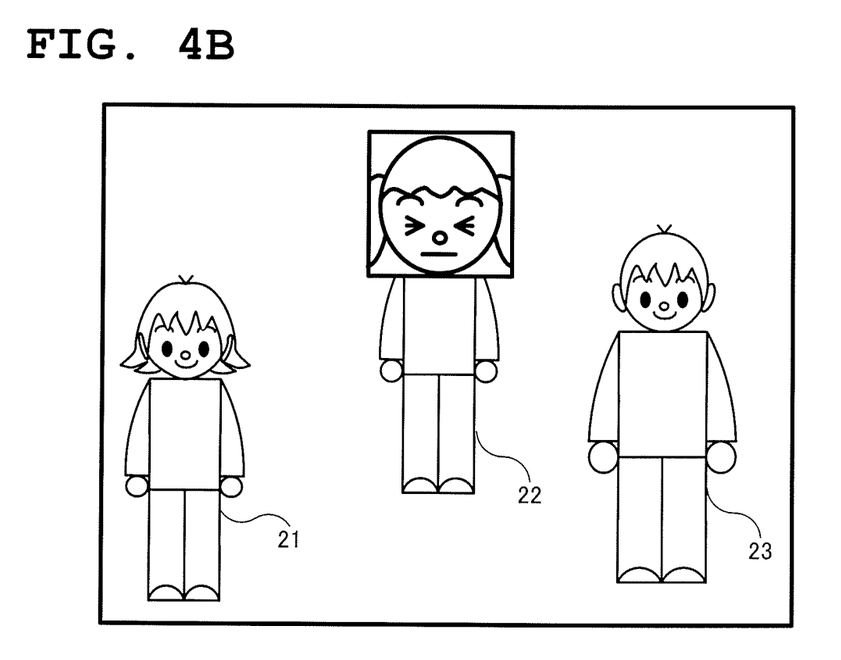
FIG. 4B is a diagram of still-image data displayed as a preview and a warning display in the variation example.

FIG. 4B is an example diagram of still-image data displayed as a preview at this time and the warning display.

As is clear from FIG. 4B, the image data within the warning frame 32 shown in FIG. 3B is displayed in an enlarged state. As a result, an area that is not in agreement is easily recognized by the user.

(07) According to the above-described embodiment, when a selected face detection result and the face detection result of the face detection processing performed on still-image data are not in agreement, information that the face detections results are not in agreement is proactively informed by the warning being displayed. Also, when the face detection results are in agreement, information that the face detection results are in agreement is passively informed by the warning not being displayed. However, the information that face detection results are in agreement may be displayed when face detection results are in agreement, and the information that face detection results are not in agreement may be displayed when face detection results are not in agreement. As a result, it is easily recognized by the user whether or not a sudden change has occurred to the photographic subject between the Live-view before imaging and the imaged still-image data.

The information that face detection results are in agreement and the information that face detection results are not in agreement may be a text. Alternatively, a symbol or the like indicating whether or not the face detection results are not in agreement may be displayed. Furthermore, a frame, referred to as an agreement frame, may be displayed over a face that is in agreement. This enables the user to know that face detection results are in agreement when this agreement frame is displayed on all faces in still-image data, and to know that face detection results are not in agreement when the agreement frame is only displayed on some faces in still-image data.

On the other hand, the information that face detection results are not in agreement may not be displayed (no warning is displayed) when face detection results are not in agreement, and the information that face detection results are in agreement may be displayed when face detection results are in agreement.

The information that face detection results are in agreement may be a text stating that face detection results are in agreement. Alternatively, a symbol or the like indicating that face detection results are in agreement may be displayed.

Moreover, the warning may be made by sound, vibrations, and the like, rather than being displayed. When face detection results are not in agreement, the information that the face detection results are not in agreement may be informed by the Live-view being displayed instead of the preview.

In short, any method can be used as long as whether or not face detection results are in agreement is clear. As a result, it is easily recognized by the user whether or not a sudden change has occurred to the photographic subject between the Live-view before imaging and the imaged still-image data.

(08) According to the above-described embodiment, when face detection results are judged not to be in agreement at Step S11, the still-image data is displayed as a preview and the warning is displayed, and when the user gives a recording instruction, the still-image data is recorded. However, when face detection results are judged not to be in agreement at Step S11, the operation may return to Step S1 after the still-image is displayed as a preview and the warning is displayed. In other words, still-image data is not recorded when the warning is displayed.

Alternatively, when face detection results are judged not to be in agreement at Step S11, after the still-image data is displayed as a preview and the warning is displayed, the operation may proceed to Step S15 at which the still-image data is recorded.

As a result, it is easily recognized by the user whether or not a sudden change has occurred to the photographic subject between the Live-view before imaging and the imaged still-image data.

(09) According to the above-described embodiment, when face detection results are judged not to be in agreement at Step S11, the still-image data is displayed as a preview and the warning is displayed. However, this warning may be made by displaying the still-image data as a preview when the face detection results are judged to be in agreement at Step S11, and not displaying the still-image data as a preview when the face detection results are judged not to be in agreement at Step S11. In this case (when face detection results are judged not to be in agreement at Step S11), the operation may return to Step S1, or proceed to Step S14 or Step S15. As a result, it is easily recognized by the user whether or not a sudden change has occurred to the photographic subject between the Live-view before imaging and the imaged still-image data.

(10) According to the above-described embodiment, imaged still-image data is displayed as a preview (Step S12 and Step S13) regardless of whether or not the face detection results are in agreement at Step S11. However, the still-image data may not be displayed as a preview.

In this case, when the face detection results are judged to be in agreement at Step S11, the operation may proceed directly to Step S15. Also, when the face detection results are judged not to be in agreement at Step S11, only the warning may be displayed at Step S13, and the operation may proceeds to Step S14. At this time, the warning display indicates that the face detection results are not in agreement using text, a symbol, and the like.

(11) According to the above-described embodiment, the warning is displayed through an identification display of a face area that is based on the position and the size of a face judged not to be in agreement in the face detection result selected at Step S9 (Step S13). However, information that the face detection results are in agreement may be simply displayed by a text, a symbol, and the like.

(12) According to the above-described embodiment, only faces are detected. However, a smile detection process may be provided, and a warning may be displayed when a smile evaluation value indicating a degree of smile detected by the smile detection processing performed on a Live-view and a smile evaluation value detected by the smile detection processing performed on still-image data are not in agreement within a predetermined range.

As the above-described embodiment, this smile evaluation value detected by the smile detection processing performed on the Live-view may be a smile evaluation value detected by the smile detection processing performed on frame image data imaged immediately before the full-depression of the shutter button. Alternatively, the smile evaluation value may be that detected by the smile detection processing performed on frame image data imaged immediately after the half-depression of the shutter button. Also, the smile evaluation value may be the highest or the lowest smile evaluation value or a mean smile evaluation value among smile evaluation values detected by the smile detection processing performed on each of frame image data imaged immediately before the full-depression of the shutter button to a predetermined amount of time earlier (a predetermined number of images earlier). Furthermore, the smile evaluation value may be that detected by the smile detection process performed on a piece of frame image data imaged a predetermined amount of time earlier (a predetermined number of images earlier) than the full-depression of the shutter button.

(13) According to the above-described embodiment, only faces are detected. However, an individual identification process may be performed, and when a registered face is present, a comparison may be performed on only the result of individual identification of the registered face, and the judgment whether or not they are not agreement may be made. In other words, the result of individual identification (the number of faces, and the position and the size of the faces) during a Live-view and the result of individual identification (the number of faces, and the position and the size of the faces) of still-image data are compared and judged whether or not they are in agreement.

(14) According to the above-described embodiment, human faces are detected. Then, the face detection result of a Live-view and the face detection result of still-image data are compared and judged whether or not they are in agreement. However, the detection is not limited to faces. Smile detection, individual identification for identifying a certain person, the detection of facial feature data (feature data for eyes, eyebrows, nose, mouth, ears, and the like), face detection for animals, animal detection for detecting animals, and the like may be performed. In short, it is only required is that a predetermined photographic subject be detected.

(15) According to the above-described embodiment, detection results, which are the number of faces, and the position and the size of the face, are compared and judged whether or not they are in agreement. However, the degree of coincidence with facial feature data (feature data for eyes, eyebrows, nose, mouth, ears, and the like) may also be compared and judged whether or not they are in agreement.

For example, in cases where a face is detected even when the eyes of the photographic subject is closed, or the photographic subject has looked away, the warning is not displayed even when the eyes of the photographic subject 22 are closed as shown in FIG. 3B. However, it goes without saying that a state in which the eyes of the photographic subject are closed, a state in which the photographic subject has looked away, and the like are photographic subject states not intended by the user. Therefore, even when a face is detected, the degree of coincidence is taken into consideration, and when the degree of coincidence is not within a predetermined range, the judgment that face detection results are in agreement is not made at Step S11.

Note that a judgment whether or not they are in agreement may be made by comparison of only the degree of coincidence with facial feature data. In other words, only an eye area or a mouth area may be compared.

(16) Furthermore, the above-described embodiment and the above-described modifications (01) to (15) may be randomly combined as the modification.

(17) The individual embodiments of the present invention as described above are merely examples as a best mode for carrying out the invention, and aims to facilitate understanding of the principle and the structure of the present invention. It is not intended to limit the scope of the present invention.

Therefore, it should be construed that various variations and modifications for the above-described embodiment of the present invention be included within the scope of the present invention and be protected by the scope of the present invention.

Lastly, in the individual embodiments as described above, a case where an imaging apparatus of the present invention is applied to the digital camera 1 is described. However, the present invention is not limited to the above-described embodiments. In other words, the present invention may be applied to any apparatus as long as it can photograph a photographic subject and detect a predetermined photographic subject.

While the present invention has been described with reference to the preferred embodiments, it is intended that the invention be not limited by any of the details of the description therein but includes all the embodiments which fall within the scope of the appended claims.

What is claimed is:
1. An imaging apparatus comprising:
   first imaging control means for performing periodic imaging;

first detection means for detecting a predetermined photographic subject from image data imaged by the first imaging control means;

instruction means for instructing imaging a still-image during the periodic imaging by the first imaging control means;

second imaging control means for imaging a still-image when instructed by the instruction means;

second detection means for detecting a predetermined photographic subject from still-image data imaged by the second imaging control means;

comparison means for comparing a result of the photographic subject detection by the first detection means with a result of the photographic subject detection by the second detection means; and informing means for informing of a comparison result by the comparison means.

2. The imaging apparatus according to claim 1, wherein the informing means accordingly informs by an indication when the comparison result by the comparison means indicates that the result of the photographic subject detection by the first detection means is not in agreement with the result of the photographic subject detection by the second detection means.

3. The imaging apparatus according to claim 1, further comprising:

a display;

wherein the informing means accordingly informs by controlling the display to display the still-image data imaged by the second imaging control means when the comparison result by the comparison means indicates that the result of the photographic subject detection by the first detection means is in agreement with the result of the photographic subject detection by the second detection means, and accordingly informs by restarting imaging by the first imaging control means without controlling the display to display the still-image data imaged by the second imaging control means when the comparison result by the comparison means indicates that the result of the photographic subject detection by the first detection means is not in agreement with the result of the photographic subject detection by the second detection means.

4. The imaging apparatus according to claim 1, further comprising:

a display;

wherein the informing means accordingly informs by controlling the display to display an indication when the comparison result by the comparison means indicates that the result of the photographic subject detection by the first detection means is not in agreement with the result of the photographic subject detection by the second detection means.

5. The imaging apparatus according to claim 4, further comprising:

display control means for controlling the display to display the image data imaged by the first imaging control means and the still-image data imaged by the second imaging control means;

wherein the informing means informs by controlling the display to perform identification display of a photographic subject area detected by the first detection means or the second detection means which is not in agreement in the still-image data displayed on the display by the display control means when the comparison results by the comparison means indicates that the result of the photographic subject detection by the first detection means is not in agreement with the result of the photographic subject detection by the second detection means.

6. The imaging apparatus according to claim 4, wherein the informing means controls the display to perform identification display by enlarging image data of a photographic subject area detected by the first detection means or the second detection means which is not in agreement in the still-image data displayed on the display by the display control means when the comparison result by the comparison means indicates that the result of the photographic subject detection by the first detection means is not in agreement with the result of the photographic subject detection by the second detection means.

7. The imaging apparatus according to claim 1, wherein the comparison means performs the comparison by determining at least one of whether or not numbers of detected photographic subjects are in agreement within a predetermined range, whether or not positions of detected photographic subjects are in agreement within a predetermined range, and whether or not sizes of detected photographic subjects are in agreement within a predetermined range, when comparing the result of the photographic subject detection performed by the first detection means and the result of the photographic subject detection performed by the second detection means.

8. The imaging apparatus according to claim 1, wherein each of the first detection means and the second detection means comprises smile detection means for detecting a smile evaluation value indicating a degree of smile of a photographic subject, and wherein the comparison means compares smile evaluation values detected by the first detection means and the second detection means.

9. The imaging apparatus according to claim 1, wherein the comparison means compares whether or not a result of the photographic subject detection performed by the first detection means and a result of the photographic subject detection performed by the second detection means are in agreement.

10. The imaging apparatus according to claim 1, further comprising:

further instruction means for instructing to prepare for imaging a still-image during the periodic imaging by the first imaging control means;

wherein the comparison means compares a result of the detection by the first detection means from the image data imaged by the first imaging control means with a result of the detection by the second detection means when preparation for imaging is instructed by the further instruction means.

11. The imaging apparatus according to claim 1, wherein the first detection means detects a predetermined photographic subject from the image data imaged by the first imaging control means immediately before imaging is instructed by the instruction means.

12. The imaging apparatus according to claim 1, wherein the first detection means sequentially detects a predetermined photographic subject from the image data periodically imaged by the first imaging control means, and the comparison means compares, with a result of the photographic subject detection by the second detection means, any one of (i) a detection result detected a predetermined number of times before a detection result by the first detection means when imaging is instructed by the instruction means, (ii) a detection result detected a predetermined amount of time before imaging is instructed by the imaging instruction means, and (iii) a highest priority photographic subject detection result among detection results detected by the first detection means.

13. The imaging apparatus according to claim 12, wherein the priority of a photographic subject detection result is determined based on at least one of proximity of each detected photographic subject to a center of a field angle, a size of each detected photographic subject in the image data, and a number of detected photographic subjects in the image data.

14. The imaging apparatus according to claim 1, wherein the second detection means detects a predetermined photographic subject from an area in the still-image data imaged by the second imaging control means which is the same area as an area of a photographic subject in a detection result by the first detection means.

15. A non-transitory computer-readable storage medium having a program stored thereon that is executable by a computer included in an imaging apparatus to cause the computer to perform a process comprising:

a first imaging control processing for performing periodic imaging;

a first detection processing for detecting a predetermined photographic subject from image data imaged by the first imaging control processing;

an instruction processing for instructing imaging of a still-image during the periodic imaging by the first imaging control processing;

a second imaging control processing for imaging a still-image when instructed by the instruction processing;

a second detection processing for detecting a predetermined photographic subject from still-image data imaged by the second imaging control processing;

a comparison processing for comparing a result of the photographic subject detection by the first detection processing with a result of the photographic subject detection by the second detection processing; and an informing processing for informing of a comparison result by the comparison processing.

* * * * *